(12) United States Patent
Smith et al.

(10) Patent No.: US 11,964,676 B2
(45) Date of Patent: Apr. 23, 2024

(54) ENERGY SAVING ACTIONS FOR AUTONOMOUS DRIVING SYSTEMS

(71) Applicant: Waymo LLC, Mountain View, CA (US)

(72) Inventors: David Smith, Sunnyvale, CA (US); Christopher Bowen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 100 days.

(21) Appl. No.: 17/120,069

(22) Filed: Dec. 11, 2020

(65) Prior Publication Data

US 2022/0185333 A1  Jun. 16, 2022

(51) Int. Cl.
*B60W 60/00* (2020.01)
*B60W 10/04* (2006.01)
(Continued)

(52) U.S. Cl.
CPC ........ *B60W 60/0023* (2020.02); *B60W 10/04* (2013.01); *B60W 10/20* (2013.01);
(Continued)

(58) Field of Classification Search
CPC .. B60W 60/0023; B60W 10/04; B60W 10/20; B60W 10/24; B60W 60/00186; B60W 2556/45; B60W 10/08; B60W 10/184; B60W 30/18127; B60W 30/18136; B60W 50/0097; B60W 2030/1809; B60W 2552/20; B60W 2554/00; B60W 2554/4041; B60W 2554/802; B60W 30/18072; B60W 2710/0655; B60W 2710/1005; B60W 2720/103;
(Continued)

(56) References Cited

U.S. PATENT DOCUMENTS 6,990,401 B2   1/2006 Neiss et al.
9,393,963 B2   7/2016 Slaton et al.
(Continued)

FOREIGN PATENT DOCUMENTS

GB   2570898 A   8/2019

OTHER PUBLICATIONS

European Search Report dated May 16, 2022, on application No. 20213643.6-1012.

*Primary Examiner* — Jean Paul Cass
*Assistant Examiner* — Alexander George Matta
(74) *Attorney, Agent, or Firm* — Lowenstein Sandler LLP

(57) ABSTRACT

A control command is provided to a vehicle control module that identifies one or more vehicle actions to be performed by the vehicle control module to control a position of an autonomous vehicle (AV) with respect to an external environment. Whether one or more conditions pertaining to the position of the AV with respect to the external environment are satisfied is determined. Responsive to determining that the one or more conditions pertaining to the position of the AV with respect to the external environment are satisfied, a first instruction is provide to the vehicle control module that permits the vehicle control module to deviate from the one or more vehicle actions identified in the control command and to perform an energy saving action with respect to the AV.

17 Claims, 5 Drawing Sheets

(51) Int. Cl.
*B60W 10/20* (2006.01)
*B60W 10/24* (2006.01)

(52) U.S. Cl.
CPC ...... *B60W 10/24* (2013.01); *B60W 60/00186* (2020.02); *B60W 2556/45* (2020.02)

(58) Field of Classification Search
CPC ...... B60W 10/06; B60W 10/11; B60W 20/12; B60W 2556/50; Y02T 10/40; Y02T 10/62; Y02T 10/84
See application file for complete search history.

(56) References Cited

U.S. PATENT DOCUMENTS

| | | |
|---|---|---|
| 2013/0030668 A1 | 1/2013 | Eriksson et al. |
| 2014/0067225 A1* | 3/2014 | Lee .................. B60W 30/188 701/93 |
| 2017/0274900 A1* | 9/2017 | Lee ............... B60W 30/18072 |
| 2018/0050701 A1* | 2/2018 | Grinenval ............ G06Q 10/047 |
| 2019/0100208 A1* | 4/2019 | Plianos .................. F02D 29/02 |
| 2019/0256096 A1* | 8/2019 | Graf ..................... G08G 1/0129 |
| 2020/0164745 A1 | 5/2020 | Mohan et al. |
| 2021/0020045 A1* | 1/2021 | Huang ............... G01C 21/3804 |
| 2021/0078600 A1* | 3/2021 | Price ........................ G08G 1/16 |
| 2021/0188274 A1* | 6/2021 | Guirlanda ............ B60W 10/18 |
| 2022/0097728 A1* | 3/2022 | Lin ........................ G06N 20/00 |

* cited by examiner

ENERGY SAVING ACTIONS FOR AUTONOMOUS DRIVING SYSTEMS

TECHNICAL FIELD

The instant specification generally relates to autonomous vehicles. More specifically, the instant specification relates to implementing an energy saving action with respect to the autonomous vehicles.

BACKGROUND

An autonomous vehicle (AV) operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various costs and, in particular, fuel costs. To improve fuel efficiency, human truck drivers use a variety of driving techniques, such as maintaining a constant speed whenever possible, accelerating through downhill sections of the road in order to acquire an additional momentum to carry the vehicle into subsequent uphill sections, and other techniques, which can be equally useful for autonomous vehicles. Successful implementation of such methods, however, can depend on the road conditions. Higher efficiency is usually achieved when traffic is light. Conversely, presence of a large number of other trucks, carrying different loads and moving with different speeds, as well as passenger cars, motorhomes, and other vehicles is often detrimental to driving performance. Challenging weather conditions can introduce further uncertainty and increase costs while negatively affecting expected delivery times.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
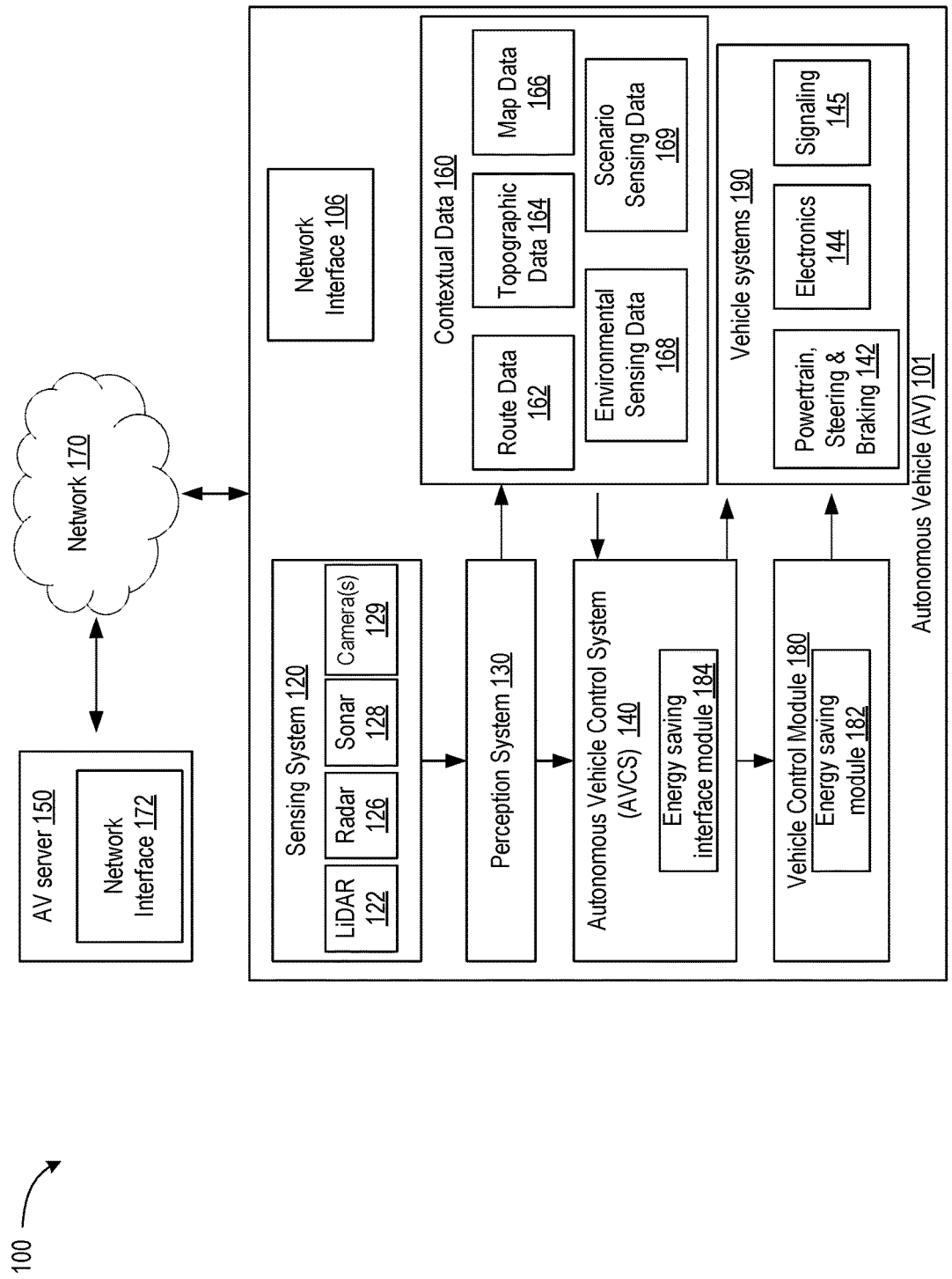
FIG. 1 is a diagram illustrating components of an example architecture of a system that controls energy saving actions performed by an autonomous vehicle (AV), in accordance with some implementations of the disclosure.

A base vehicle, such as a truck, can be designed or produced by a third-party. The truck as designed by the third-party can implement one or more energy saving actions. An energy saving action can refer to a vehicle action that saves energy. With respect to an internal combustion engine (ICE), an energy saving action can include a fuel saving action (e.g., reducing or stopping fuel injection). With respect to an electric engine (e.g., electric motor) or hybrid vehicle, an energy saving action can include a power or electricity saving action (e.g., disconnecting the motor from the electric power source). In some instances, the base vehicle may be converted into an autonomous vehicle (AV) using various sensors, electronics, and/or control systems, for example. An AV can host an AV control system (AVCS) that has absolute authority with respect to planning and decision-making on positioning and operation of the AV. For example, the AVCS can control the position of the AV based on a very strict tolerance such as by permitting only a minimal deviation (e.g., a deviation not exceeding a threshold of a few centimeters) from the requested position of the AV.

An AV can also host a vehicle control module (VCM) that is implemented to help control some functions of the base vehicle, such as the actuation of various vehicle components or systems, and to help control one or more energy saving actions. In some cases, the VCM can be designed and defined by a third-party, such as the designer of the base vehicle. When converting a base vehicle to an AV, some elements of the base vehicle, such as the VCM, can be integrated with the AVCS in an effort to leverage the functionality that has already been designed into the VCM. For example, the AVCS can control the positioning and the operation of the AV by sending control commands to the VCM that is hosted by the AV. The control commands can direct the VCM to perform vehicle actions, such as braking, steering, and throttling, such that the VCM actuates the corresponding components of the brake system, steering system, and powertrain, respectively in the performance of the vehicle actions. With respect to the energy saving actions, the VCM can place the vehicle into a position to execute the energy saving action, analyze criteria (e.g., current topology, vehicle speed, etc.) to determine whether to execute an energy saving action, as well as execute the energy saving action responsive to determining the criteria associated with the energy saving action is satisfied. However, integrating the execution of one or more energy saving actions defined by the VCM with the planning and decision making responsibilities of AVCS can be challenging at least because the energy saving actions defined by the VCM often deviate from the precise control and positioning scheme implemented by the AVCS. In some instances where AVCS has authority with respect to planning and decision making, the energy saving actions defined by a vehicle control module (VCM) of the base vehicle can go unimplemented in favor of the absolute authority of the AVCS.

Aspects of the disclosure address the above challenges along with others, by allowing for the integration of the energy saving actions within the control scheme of the AVCS.

In some implementations and as noted above, an AVCS can be the authority and/or primary system involved in planning and decision making with respect to the positioning and operations of the AV. The AVCS can receive various contextual data (e.g., such as GPS data, map data, traffic data, environmental sensing data, etc.) and make decisions about the positioning of the AV with respect to the external environment. To control the positioning of the AV, the AVCS can send one or more control commands to a VCM for execution by the VCM. The VCM is expected to execute the control commands (e.g. actuate throttle, braking, or steering)

within a strict tolerance such that the position of the AV as determined by the AVCS can be controlled with precision.

In some implementations, the AVCS can receive, from the VCM, an indication of an energy saving action that is suggested to be performed by the VCM. The energy saving action can be an energy saving action that is to be performed nearly instantaneously (e.g., within 1 second). The AVCS can provide, to the VCM, a control command identifying one or more vehicle actions (e.g., increase throttle) to be performed by the vehicle control module to control a position of an autonomous vehicle (AV) with respect to an external environment. The control commands can be issued to control the position of the AV with strict precision. The AVCS can determine whether one or more conditions pertaining to the energy saving action (e.g., based on the position of the AV with respect to the external environment) are satisfied. For instance, the AVCS can determine that at the AV's current position there are no other vehicles or obstacles near the AV that would prevent the performance of the energy saving action. Responsive to determining that the one or more conditions pertaining to the energy saving action (e.g., in view of the position of the AV with respect to the external environment) are satisfied, the AVCS can provide, to the vehicle control module, a first instruction that permits the vehicle control module to deviate from the one or more vehicle actions identified in the control command and to perform an energy saving action with respect to the AV. In some implementations, the AVCS can use the first instruction to relax some constraints identified in the control command. For example, the tolerance of the amount of throttle or speed identified in the control command can be relaxed from 0.1 percent to 10 percent. Rather than implementing the control commands with a strict tolerance, the VCM can be allowed to perform the control commands with a relaxed tolerance, which would place the AV in a position where the energy saving action can be performed safely. If the VCM can perform the energy saving action within the relaxed constraints, the VCM is permitted to execute the energy saving action.

In some implementations, AVCS receives, from the VCM, an indication of a suggested future energy saving action to be performed by the VCM. The AVCS can determine one or more additional vehicle actions to move the AV to a position that allows the suggested future energy saving action to be performed. The AVCS can provide an additional control command identifying the one or more additional vehicle actions to move the AV to the new position. At the time when the future suggested energy saving action (e.g., now current energy saving action) is to be performed, the AVCS can evaluate whether one or more conditions pertaining to the energy saving action (e.g., in view of the new position of the AV with respect to the external environment) are satisfied. If the one or more conditions are satisfied, the AVCS can provide additional instructions that permit the VCM to perform the energy saving action and to deviate from the current control commands.

Therefore, advantages of the systems and methods implemented in accordance with some aspects of the disclosure include, but are not limited to improving the performance of an autonomous vehicle by implementing energy saving actions, as described in more detail herein.

FIG. 1 is a diagram illustrating components of an example architecture 100 of a system that controls energy saving actions performed by an autonomous vehicle (AV) 101, in accordance with some implementations of the disclosure. Although alternatively referred to as "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nm wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more radar units 126, which can be any system that utilizes radio or microwave frequency signals to sense objects within the driving environment of the AV 101. The radar unit(s) can be configured to sense both the spatial locations of the objects (including their spatial dimensions) and their velocities (e.g., using the Doppler shift technology), such as translational velocities and angular (rotational) velocities. The sensing system 120 can include one or more LiDAR sensors 122 (e.g., a LiDAR rangefinders), which can be laser-based units capable of determining distances (e.g., using ToF technology) to the objects in the environment around AV 101. For example, LiDAR(s) 122 can emit one or more laser signals (pulses) that travel to an object and then detect arrived signals reflected from the object. By determining a time delay between the signal emission and the arrival of the retro-reflected waves, a ToF LiDAR can determine the distance to the object. LiDAR(s) 122 can emit signals in various directions to obtain a wide view of the outside environment. LiDAR(s) 122 can utilize wavelengths of electromagnetic waves that are shorter than the wavelength of the radio waves and can, therefore, provide a higher spatial resolution and sensitivity compared with the radar unit 126. In some implementations, LiDAR(s) 122 can be (or include) coherent LiDAR(s), such as a frequency-modulated continuous-wave (FMCW) LiDAR(s). FMCW LiDAR(s) (or some other coherent LiDAR sensors) can use optical heterodyne detection for instant velocity determination. LiDAR(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR(s) 122. In some implementations, LiDAR(s) 122 can ensure a 360-degree view in a horizontal direction and up to 90 degrees in the vertical direction.

Sensing system 120 can further include one or more cameras 129 to capture images of the driving environment. The images can be two-dimensional projections of the driving environment (or parts of the driving environment) onto a projecting plane (flat or non-flat, e.g. fisheye) of the cameras. Some of cameras 129 of sensing system 120 can be video cameras configured to capture a continuous (or quasi-continuous) stream of images of the driving environment. Sensing system 120 can also include one or more sonars 128, which can be ultrasonic sonars, in some implementations.

The sensing data obtained by sensing system 120 can be processed by a perception system 130 that can be configured to detect and track objects in the driving environment and to identify the detected objects. For example, perception system 130 can analyze images captured by cameras 129 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 129. In one example, the camera(s) 129 can detect an image of a rock partially obstructing a traffic lane. Using the data from the camera(s) 129, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate or be used to help generate at least some contextual data 160. Contextual data 160 can include one or more of route data 162, topographic data 164, map data 166, environmental sensing data 168, scenario sensing data 169, or GPS data (not shown). Herein "route" shall refer to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein shall refer to any portion of the overall driving task. Route data 162 can include information about the starting point, intermediate points and destination point of the route (e.g., longitude and latitude information of points along the route) and include physical characteristics of various routes. "Trajectory" shall refer to driving settings, specified for various locations along the route, and shall include speed/throttle/brake/etc. control that determine progression of the vehicle along the route. For example, a trajectory can include throttle settings, $T(L)$ as a function of the location L along the route, target speed of the vehicle $S(L)$, gear selection sequences, and so on. The location L can be identified by the distance travelled, GPS coordinates, road markers (e.g., mileposts), or a combination thereof, or in any other way. Topographic data 164 can include information about the topography of the roads (e.g., grade and radius of curvature) or topography along the route. Map data 166 can include information about the road network along the route, such as the quality of road surfaces, number of lanes, speed limits, type and number of exit ramps, availability of gas stations, and so on. Map data 166 can also include traffic data that includes information about historic traffic patterns or current traffic conditions along or near the route. Environmental sensing data 168 can be the data obtained by sensing system 120 and/or include data from the perception system 130 that has been generated using the data from the sensing system 120. For example, environmental sensing data 168 can include information describing the environment near or around the AV 101 (e.g., position of other vehicles, obstacles, or other elements with respect to the AV 101). Scenario sensing data 169 can include predicative data generated by using other contextual data, such as environmental sensing data 168 to make predictions about future scenarios. For example, the environmental sensing data 168 can indicate that another vehicle is in an adjacent lane and has an engaged turn signal. The corresponding scenario sensing data 169 can include information indicating a prediction that the vehicle will enter the same lane that AV 101 currently occupies in 3 seconds and will be approximately 3 meters in front of the AV 101 at that time.

The data generated by perception system 130 as well as various additional data (e.g., contextual data 160, GPS data processing module, and the like) can be used by an autonomous driving system, such as AV 101 control system (AVCS) 140. The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 190 (e.g., the powertrain, steering and braking 142, vehicle electronics 144, and signaling 145), vehicle control module 180, and other systems and components not explicitly shown in FIG. 1. The powertrain, steering and braking 142 can include an engine (internal combustion engine, electric engine (motor), and so on), transmission, differentials, axles, wheels, steering mechanism, braking mechanism, and other systems. The vehicle electronics 144 can include an on-board computer, engine management, ignition, communication systems, carputers, telematics, in-car entertainment systems, and other systems and components. The signaling 146 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 142 (or signaling 146), whereas other instructions output by the AVCS 140 are first delivered to the vehicle control module 180, which can generate commands to the powertrain, steering and braking 142 and/or signaling 145.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 142 (directly or via the vehicle control module 180) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, steering and braking 142 (directly or via the vehicle control module 180) to resume the previous speed settings of the vehicle.

In some implementations, AVCS 140 can include an energy saving interface module 184 than can interface with vehicle control module 180, and in particular with energy saving module 182 of the vehicle control module 180. The operations of energy saving interface module 184 are further described below in conjunction with the following Figures.

In some implementations, vehicle control module 180 can control the vehicle systems 190 at the behest of the AVCS 140. AVCS 140 can send a control command, rather than directly to the vehicle systems 190, to vehicle control module 180. Vehicle control module 180 can execute the control command by actuating one or more of the vehicle systems 190. The interaction between AVCS 140 and vehicle control module 180 is further described with respect to the below Figures.

In some implementations, vehicle control module 180, and in particular energy saving module 182, can suggest, to AVCS 140, one or more energy saving actions that can be performed by the vehicle control module 180 and that can allow the AV 101 to save energy. In some implementations, AVCS 140, under particular conditions, may permit vehicle control module 180 to perform one or more energy saving actions. Under permission by the AVCS 140, vehicle control module 180 can execute one or more energy saving actions via energy saving module 182. Energy saving actions are further described with respect to the below Figures.

In some implementations, vehicle control module 180 can be a third-party vehicle control module. A third party can refer to an entity, such as enterprise or business (e.g., designer or manufacturer of the base vehicle) that is distinct from another entity, such as the entity converting the base vehicle into an AV. As noted above, in some embodiments an entity can design or manufacture the base vehicle, including the vehicle control module 180, and another entity can convert the base vehicle into an AV. In some implementations, the third-party vehicle control module 180 is designed, produced, or controlled by an entity that is different from the entity that designed, produced, or has control over the AVCS 140. In some implementations, vehicle control module 180 is not a third-party vehicle control module. For instance, the vehicle control module 180 can be a first-party element designed by the entity that converts the base vehicle to an AV. In cases where the AV is designed from the "ground up" as an autonomous vehicle, the vehicle control module 180 and AVCS 140 can be designed by the same entity. In some implementations, the vehicle control module 180 is integrated with the AVCS 140. For example, the vehicle control module 180 can be designed as a "plug-in" or other software component that adds one or more features to the AVCS 140. For instance, the VCM 180 can be updated/upgraded with new or improved energy saving operations without updating/upgrading the entirety of the AVCS 140.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to stating the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 172 (on the side of AV server 150). Network interfaces 106 and 172 can include antennas, network controllers, radio circuits, amplifiers, analog-to-digital and digital-to-analog converters, physical layers (PHY), media access control layers (MAC), and the like.

Figure 2A:
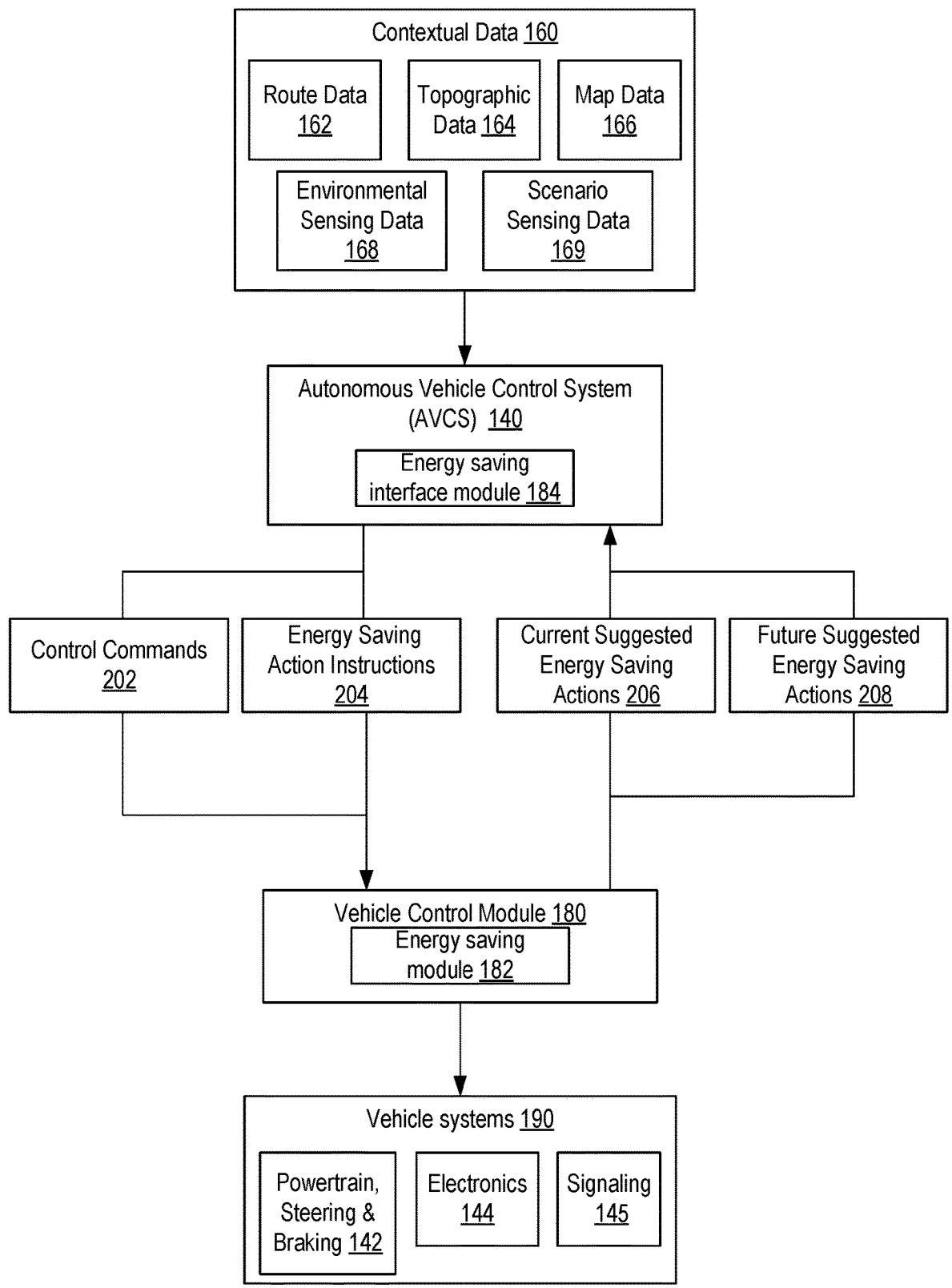
FIG. 2A is a diagram illustrating components of an example architecture of a system and example data flows pertaining to the control of energy saving actions, in accordance with some implementations of the disclosure.

FIG. 2A is a diagram illustrating components of an example architecture 200 of a system and example data flows during the control of energy saving actions, in accordance with some implementations of the disclosure. Components of FIG. 1 are used to help describe aspects of FIG. 2A. Operations performed by AVCS 140 can be assumed to be performed by energy saving interface module 184, unless otherwise indicated. Operations performed by vehicle control module 180 (VCM 180) can be assumed to be performed by energy saving module 182, unless otherwise indicated.

In some implementations, AVCS 140 can be the primary authority and/or component involved in planning and decision making on positioning and operation of the AV. The AVCS 140 can receive various contextual data, as illustrated by contextual data 160, and make decisions about the positioning of the AV with respect to the external environment based on the contextual data 160. In some implementations, the AVCS 140 controls the position of the AV based on a very strict tolerance (e.g., within a few centimeters from the requested position). For example, the AVCS 140 can evaluate the contextual data 160 and determine a position with respect to the external environment to move the AV. To control the positioning of the AV, AVCS 140 can send one or more control commands 202 to the VCM 180 for execution by the VCM 180. In some implementations, the VCM 180 is expected to execute the control commands 202 within the constraints imposed by the control commands 202 such that the position of the AV as determined by the AVCS 140 can be controlled with precision.

For example, the AVCS 140 can send one or more control commands 202 to the VCM 180. The vehicle control module 180 can receive the one or more control commands 202 from AVCS 140. In some implementations, the control commands can identify a vehicle action and/or constraints associated with the vehicle action. The vehicle action can refer, for example, to the movement or positioning of the AV and can be taken, for example, by one or more of the powertrain, steering, or braking systems. The constraints can refer, for example, to the parameters related to the vehicle action and/or the tolerance allowed by the AVCS 140 in executing the vehicle action at the given parameter value. For instance, AVCS 140 can send a control command 202 to apply brake pressure (e.g., vehicle action) of some amount (e.g., X pounds per square inch (PSI)) with a given tolerance (e.g. 0.1 percent (%)) (where the amount of brake pressure and tolerance are a constraint). Vehicle control module 180 can actuate the brakes of the AV to apply the amount of pressure within the prescribed constraints as identified by the control command 202.

In some implementations, VCM 180 may provide additional functionality that allows the VCM 180 to identify situations where energy saving actions can be performed. For example, the base vehicle can be equipped with some sensing elements (e.g., sensors to sense the speed of the vehicle, a coordinate system, a gyroscope etc.) that provide sensing data to the VCM 180. In some implementations, the sensing elements of the base vehicle do not provide the requisite information to convert the base vehicle to an AV. However, the sensing elements of the base vehicle can be adequately sufficient to provide enough sensing data to the VCM 180 to allow the VCM 180 to determine whether an energy saving action can be performed. For example, to determine whether an energy saving action can be performed, the VCM 180 can compare the sensing data to one or more criteria corresponding to the energy saving action (e.g., the vehicle is traveling at the requisite speed and is located at the requisite location in view of the coordinate system to perform an energy saving action). If the VCM 180 determines that the one or more criteria are satisfied, the VCM 180 determines that the energy saving action can be performed. If the VCM 180 determines that the one or more criteria are not satisfied, the VCM 180 determines that the energy saving action cannot be performed safely. In some implementations, VCM 180 can recommend one or more energy saving actions to the AVCS 140 that may be performed by the AV. In some implementations, the energy saving actions can include current suggested energy saving actions 208 and future suggested energy saving actions 208. The current suggested energy saving actions 206 can refer to energy saving actions that can be executed by the VCM 180 in the current time window (e.g., substantially instantaneously, such as within 1 second). Future suggested energy saving actions 208 can refer to energy saving actions that can be executed by the VCM 180 in a future time window (e.g., several seconds to minutes ahead in time). It can be noted that in some implementations, AVCS 140 can identify energy saving actions without receiving suggested energy saving actions from VCM 180. For example, the AVCS 140 can access the same or similar sensing data that is made available to the VCM 180. Similarly, the AVCS 140 can access information that describes the energy saving actions as well as the criteria used by the VCM 180 to determine whether a respective energy saving action can be performed. To identify energy saving actions without receiving suggested energy saving actions from the VCM 180, the AVCS 140 can access the above information and can evaluate or compare the sensing data against the same or similar criteria used by the VCM 180 in determining whether an energy saving action can be performed. Current suggested energy saving actions 206, future suggested energy saving actions 208, and energy saving actions that are identified by AVCS 140 without receiving suggested energy saving actions from VCM 180 are collectively referred to as energy saving actions herein, unless otherwise described.

An energy saving action can refer to a vehicle action that results in reduction of energy consumed by an AV. With respect to an AV with an internal combustion engine (ICE), an energy saving action can include a fuel saving action. With respect to an AV with an electric engine (e.g., electric motor) or hybrid AV, an energy saving action can include a power or electricity saving action. In some implementations, an energy saving action can include at least one of a disengagement of a powertrain of the AV, a withholding of a supply of energy to an engine of the AV, or a regenerative energy action. Disengagement of a powertrain can include placing the AV in neutral gear (e.g. coasting) or decoupling the power of the engine from the wheels. Withholding a supply of energy to an engine of the AV 101 can include reducing or stopping fuel injection to the ICE or reducing or stopping the electricity provided to the electric engine (e.g., motor). A regenerative energy action can include an action that returns to or generates energy for the AV. A regenerative braking technique that returns energy to the AV through braking or other regenerative technique can be implemented.

In some implementations, using one or more of the contextual data 160, AVCS 140 can determine whether one or more conditions pertaining to the position of the AV with respect to the external environment (e.g., pertaining to the energy saving action) are satisfied, which can allow for the performance or execution of one or more energy saving actions. In an illustrative example, the energy saving action can include a withholding of a supply of energy to the AV (e.g., fuel injection is reduced or stopped). The conditions that allow for the energy saving action can be as follows: 1) the AV is near (X meters) from a crest of an incline, 2) the crest of the incline is followed directly by a decline having a minimum of distance of Y meters and have a minimum gradient, 3) the current vehicle speed is in range of A and P kilometers per hour (km/h), and 4) there are not vehicles or other objects near the AV that would prohibit the execution of the energy saving action. It can be noted that the aforementioned energy saving action (with corresponding conditions) is later referred to as a cresting energy saving action. In the above example, all of the aforementioned conditions should be satisfied to allow for the performance of the cresting energy saving action. Using the contextual data 160, AVCS 140 can determine whether the one or more conditions pertaining to the energy saving action are satisfied. It can be noted that the above conditions are described for purposes of illustration, rather than limitation. It can be appreciated that numerous energy saving actions can be implemented and that the conditions associated with the energy saving action can vary. Examples of some energy saving actions, such as a cresting energy saving action, are further illustrated with respect to FIG. 2B.

In some implementations, responsive to determining that the one or more conditions pertaining to the position of the AV with respect to the external environment are satisfied (e.g., one or more conditions pertaining to an energy saving action are satisfied), AVCS 140 can issue instructions related to the energy saving action (i.e., energy saving action instruction 204). In some implementations, the energy saving action instruction 204 is provided to the VCM 180. In some implementations, the energy saving action instruction 204 is provided to the VCM 180 in addition to one or more control commands 202, where the timeframe for the execution of the control commands 202 overlap with the execution of the energy saving action associated with the energy saving action instruction 204.

In some implementations, the energy saving action instruction 204 can either permit the VCM 180 to perform the corresponding energy saving action or prohibit the performance of the corresponding energy saving action. In the case that the energy saving action instruction 204 prohibits the performance of the energy saving action, VCM 180 can execute the one or more control commands 202 as defined and sent by AVCS 140. In some implementations, in the case that the energy saving action instruction 204 permits the performance of the energy saving action, VCM 180 is permitted to execute the energy saving action but is not required to execute the energy saving action. The VCM 180 is permitted some freedom (e.g., in contrast to the control commands 202) on determining whether to execute the energy saving action in view of energy saving action instruction 204. For example, the VCM 180 can determine whether one or more criteria corresponding to the energy saving action are satisfied. If the criteria are satisfied, the VCM 180 performs the energy saving action. If the criteria are not satisfied, the VCM 180 does not perform the energy saving action and performs the control commands 202 (e.g., within the constraints defined by the control commands 202).

In some implementations, the energy saving action instruction 204 not only permits the VCM 180 to perform the energy saving action but also permits the VCM 180 to deviate from the one or more vehicle actions identified in the one or more control commands 202. In some implementations, to deviate from the one or more vehicle actions, the VCM 180 can perform different vehicle actions from those vehicle actions identified in the control commands 202. For example, the energy saving action instruction 204 can define one or more alternative vehicle actions that the VCM 180 is allowed to perform to execute a corresponding energy saving action. In some implementations, to deviate from the one or more vehicle actions, VCM 180 is allowed to deviate from the constraints identified in the control commands 202. To deviate from the constraints identified in the control commands 202, the VCM 180 should execute the control commands 202 and is permitted to execute these commands with relaxed constraints. In some implementations, the energy saving action instruction 204 can identify which constraints can be relaxed and how (e.g., the amount or extent) the constraints can be relaxed. In some implementations, the energy saving action instruction 204 identifies a range within which the VCM 180 can deviate from the constraints identified in the control commands 202 or a duration (or instance of time or range of time) during which the VCM 180 is permitted to deviate from the constraints. In some implementations, the control commands 202 can identify one or more durations in time during which the VCM 180 is permitted to deviate from the constraints. In some instances, the different durations can be associated with relaxed constraints as further described in more detail below.

In an illustrative example, a control command 202 indicates X amount of throttle that should be applied at time 0 with a tolerance of 0.1 percent, Y amount of throttle that should be applied at time 1 with a tolerance of 0.1 percent, and Z amount of throttle that should be applied at time 2 with a tolerance of 0.1 percent to maintain a speed of approximately 60 km/h during time 0 through time 2. AVCS 140 can determine that one or more conditions pertaining to the position of the AV within respect to the external environment are satisfied (e.g., or one or more conditions pertaining to the energy saving action are satisfied). For instance, AVCS 140 can determine that the conditions with respect to the cresting energy action as described above are satisfied. In response, AVCS 140 can send an energy saving action instruction 204 to VCM 180. The energy saving action instruction 204 permits the VCM 180 to perform the energy saving action identified in the energy saving action instruction 204. The energy saving action instruction 204 also identifies deviation characteristics (e.g., relaxation characteristics) that describe the bounds under which the VCM 180 is allowed to deviate from the control command 202 in the performance of the energy saving action. For instance, the energy saving action instruction 204 can identify that at time 0 the X amount of throttle can have a tolerance of ±70 percent, at time 1 the Y amount of throttle at time 1 can have a tolerance of ±50 percent, and the Z amount of throttle at time 2 can have a tolerance of 0.5 percent. If the VCM 180 can perform the energy saving action within the relaxed constraints identified in the energy saving action instruction 204, the VCM 180 is permitted to perform the energy saving action. If the VCM 180 cannot perform the energy saving action within the relaxed constraints, the VCM 180 is not permitted to perform the energy saving action. If the VCM 180 determines that the energy saving action can be performed within the relaxed constraints (and in some cases independently determines that criteria corresponding to the energy saving action have been satisfied, as described above), VCM 180 executes the energy saving action by appropriately controlling the corresponding vehicle systems 190 (e.g., powertrain, steering, and braking) within the relaxed constraints defined by the energy saving action instruction 204.

In some implementations, the VCM 180 can send to the AVCS 140 an indication of a current suggested energy saving action 206. The AVCS 140 can respond to the current suggested energy saving actions 206 in a similar manner as described above.

In some implementations, the VCM 180 can send to the AVCS 140 an indication of a suggested future energy saving action 208. The future suggested energy saving action can be far enough in the future such that the AVCS 140 can put the AV into a position that allows the suggested future energy saving action to be performed. In some implementations, the indication of a suggested future energy action can identify one or more of the particular energy saving action or information pertaining to the energy saving action, such as the AV speed (e.g., suggested or required speed range) at one or more particular locations before or during the execution of the energy saving action.

In an illustrative example, the future suggested energy saving action can be a cresting energy saving action (as described above) that can be performed in roughly 45 seconds or about 1300 meters ahead of the AV (e.g., if 1) the AV is near (X meters) from a crest of an incline, and 2) the crest of the incline is followed directly by a decline having a minimum of distance of Y meters and have a minimum gradient). In the cresting energy saving action, the AV will temporarily reduce or stop fuel injection to the engine before reaching the crest of hill such that the momentum of the AV carries the vehicle over the crest of the hill and the AV can use the decline of the hill to regain speed rather than fueling the engine. To execute the energy saving action, the AV should be positioned a threshold distance from any vehicles in front of or behind the AV as well as be at a threshold speed. Further, the AV should consider the future position of any vehicles near the AV within a time range (e.g., evaluate the other vehicles' current position, relative speeds, turn signal indicators and predict where the other vehicles will be positioned relative to the AV in the next 10 seconds). To put the AV in a position that would allow the VCM 180 to execute the cresting energy saving action, the AVCS 140 can change the particular route plan and move away from any vehicles (e.g., change lanes, speed up, or slow down) and/or maintain the AV at a requisite speed so that at the time the cresting energy saving action is to be executed, the AV would be in a position that allows for the cresting energy saving action to be performed (e.g., ensuring that the conditions pertaining to the position of the AV or cresting energy saving action are satisfied). In some implementations, before issuing control commands 202 putting the AV in a position so that the cresting energy saving action can be performed, the AVCS 140 can evaluate whether the energy in putting the AV in the position so that the energy saving action (e.g., cresting energy saving action) can be performed and performing the energy saving action is more energy efficient (e.g., has more energy savings) than continuing with current planned trajectory of the AV. In some implementations, if the AVCS 140 determines that putting the AV in the position so that the cresting energy saving action can be performed and/or putting the AV in the position and performing the energy saving action is more energy efficient than continuing on the current planned trajectory, the AVCS 140 can issue one or more control commands 202 to put the AV at a position that allows the suggested future energy saving action 208 to be performed.

In some implementations, at the time the suggested future energy saving action 208 is to be performed, AVCS 140 performs the operations as described above pertaining to the energy saving action. For example, the AVCS 140 determines whether one or more conditions pertaining to the position of the AV with respect to the external environment (e.g., pertaining to the energy saving actions) are satisfied. If satisfied, the AVCS 140 provides, to the VCM 180, an energy saving action instruction 204 that permits the VCM 180 to perform the energy saving action and to deviate from the one or more vehicle actions identified in the control commands 202. If not satisfied, the AVCS 140 provides, to the VCM 180 an energy saving instruction that prohibits the VCM 180 from performing the energy saving action. The VCM 180 is allowed to perform the control commands 202 within the specified constraints.

Figure 2B:
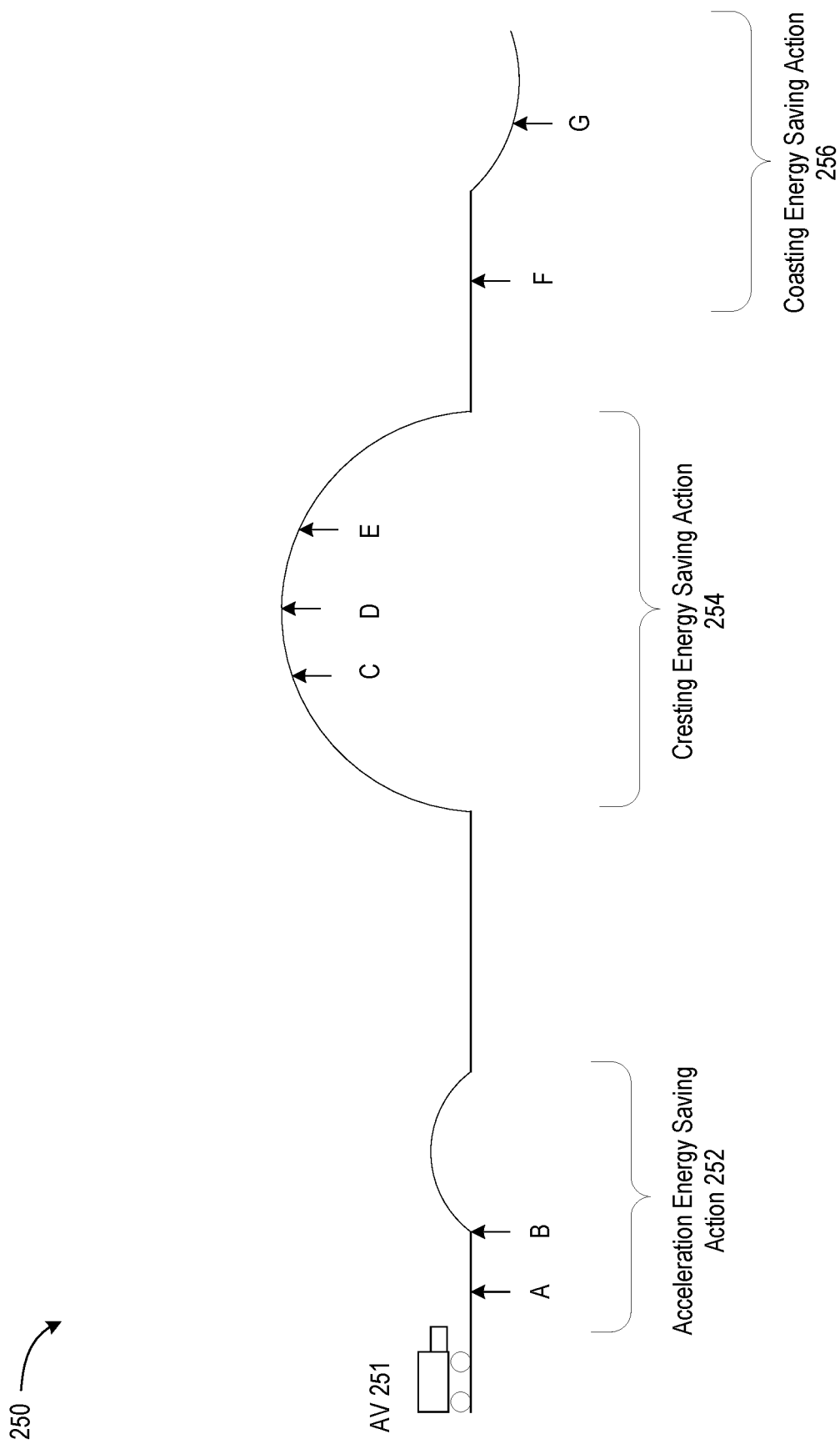
FIG. 2B is a diagram illustrating a performance of examples of energy saving actions, in accordance with some implementations of the disclosure.

FIG. 2B is a diagram illustrating a performance of examples of energy saving actions, in accordance with some implementations of the disclosure. Diagram 250 illustrates a topology where some exemplary energy saving actions can be performed. It can be noted that the topological features are not to scale, but are provided for purposes of illustration rather than limitation. It can also be noted that the energy saving actions illustrated in diagram 250 are provided for purposes of illustration, rather than limitation and that other energy saving actions are within the scope of this disclosure. Further, the energy saving actions provided in diagram 250 can be performed differently in different vehicles, different topologies, different situations (e.g., weather, traffic, etc.), or otherwise varied without deviating from the scope of the disclosure.

Diagram 251 illustrates the topology where the energy saving actions, acceleration energy saving action 252, cresting energy saving action 254, and coasting energy saving action 256 can be performed. A through F represent locations in the topology. It can be noted that in performing the energy saving actions in some implementations the AVCS can send control commands and/or energy saving action instructions to the vehicle control model that allow the vehicle control module to deviate from control commands and perform the respective energy saving actions.

In some implementations, AV 251 can perform an acceleration energy saving action 252. The acceleration energy saving action 252 can allow AV 251 to accelerate on relatively level roads before a small incline and use the resultant kinetic energy to carry the AV 251 over the small incline. Such an acceleration energy saving action 252 can be used in a topology with rolling hills, for example. Acceleration energy saving action 252 as illustrated in diagram 250 shows AV 251 traveling along relatively level terrain (e.g., 4 percent grade) before location A. Before location A (and after), AV 251 is directed to maintain a particular speed using one or more control commands. In the performance of the acceleration energy saving action 252, AV 251 at location A can accelerate (via an energy saving instruction that allows AV 251 to deviate from the control command regulating the AV's speed). At location B (at or near the base of the hill), AV 251 can coast (e.g., withhold the supply of energy to the engine or disengage the powertrain) to use the AV's kinetic energy to climb the incline. During the incline of the hill, the AV 251 can continue coasting and the speed of the AV 251 can drop below the speed specified by the one or more control commands (e.g., via the energy saving instruction). The AV 251 can continue coasting down the decline of the hill and regain at least some of the speed lost during the incline. At some point past the crest, AV 251 can re-supply energy to the engine or re-engage the powertrain, accordingly, and operate in accordance with any control commands.

In some implementations, AV 251 can perform a cresting energy saving action 254, as described herein. The topological feature associated with the cresting energy saving action 254 can be a larger hill or mountain, for example. Before location C (and after), AV 251 is directed to maintain a particular speed using one or more control commands. In the performance of the cresting energy saving action 254, AV 251 at location C (before the crest at location D) can coast via an energy saving instruction that allows AV 251 to deviate from the control command regulating the AV's speed. During incline from location C to the crest at location D the AV 251 can continue coasting and can decelerate, which deviates from the speed specified in one or control commands. After the crest at location D, the AV 251 can continue to coast until a particular location, such as location E. At location E, AV 251 can re-supply energy to the engine or re-engage the powertrain, accordingly, and operate in accordance with any control commands.

In some implementations, AV 251 can perform a coasting energy saving action 256. The coasting energy saving action 256 can allow an AV that is traveling on relatively level terrain to take advantage of the potential energy of a future decline in the topography. For example, before location F (and after), AV 251 is directed to maintain a particular speed using one or more control commands. In the performance of the coasting energy saving action 256, AV 251 at location F can coast via an energy saving instruction that allows AV 251 to deviate from the control command regulating the AV's speed. After location F, AV 251 can decelerate (in coast) and deviate from the speed specified in one or more control commands (via energy saving instruction(s)). As the topology begins to decline (between location E and F), the AV 251 can continue to coast until a particular location, such as location G. At location G, AV 251 can re-supply energy to the engine or re-engage the powertrain, accordingly, and operate in accordance with any control commands.

Figure 3:
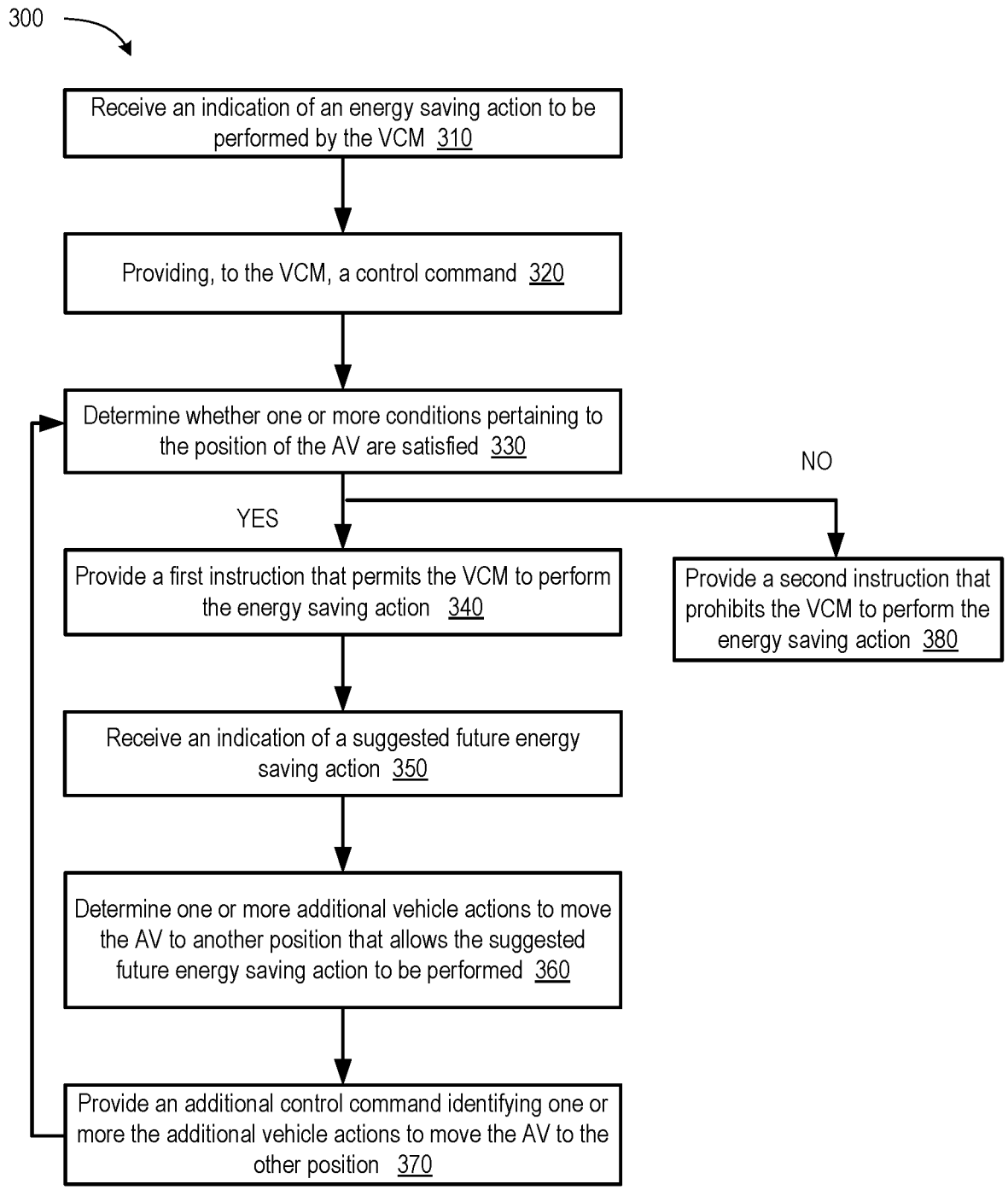
FIG. 3 depicts a flow diagram of an example method of permitting the vehicle control module to perform an energy saving action and deviate from one or more vehicle actions, in accordance with some implementations of the disclosure.

FIG. 3 depicts a flow diagram of an example method 300 of permitting the vehicle control module (VCM) to perform an energy saving action and deviate from one or more vehicle actions, in accordance with some implementations of the disclosure. Method 300 and/or each of method 300's individual functions, routines, subroutines, or operations can be performed by a processing device, having one or more processing units (CPU) and memory devices communicatively coupled to the CPU(s). The processing device executing methods 300 can perform instructions from various components of a route processing server (located outside an autonomous vehicle) or a client route processing module (located within or at the autonomous vehicle), or any combination thereof. In some implementations, method 300 can be performed by a single processing thread or alternatively by two or more processing threads, each thread executing one or more individual functions, routines, subroutines, or operations of the method. The method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by energy saving interface module 184 described in FIGS. 1 and 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed.

At operation 310, processing logic receives an indication of an energy saving action to be performed by the VCM. In some implementations, processing logic receives, from the VCM, an indication of the energy saving action that is a suggested energy saving action to be performed by the VCM. In some implementations, the VCM is a third-party vehicle control module that maintains a list of energy saving actions each associated with a particular set of criteria appropriate for the performance of a respective energy saving action. The VCM can select an energy saving action to suggest based on sensing data (and in some cases contextual data as described herein) associated with the AV. For example and a noted above, to determine whether an energy saving action can be performed, the VCM can compare the sensing data to one or more criteria corresponding to the energy saving action (e.g., the vehicle is traveling at the requisite speed and is located at the requisite location in view of the coordinate system to perform an energy saving action). If the VCM determines that the one or more criteria are satisfied, the VCM determines that the energy saving action can be performed and sends an indication of the energy saving action to the AVCS. In some embodiments, if the VCM determines that the one or more criteria are not satisfied, the VCM determines that the energy saving action cannot be performed safely, the VCM does note send an indication of the energy saving action to the AVCS. In some embodiments, if the if the VCM determines that the one or more criteria are not satisfied, the VCM can still send an indication of the energy saving action to the AVCS to allow the AVCS to make a determination on whether to permit the VCM to perform the energy saving action (e.g., the AVCS may move the AV to a position where the VCM can perform the energy saving action safely).

At operation 320, processing logic provides, to the VCM, a control command. In some implementations, processing logic provides, to a VCM, a control command identifying one or more vehicle actions to be performed by the VCM to control a position of an autonomous vehicle (AV) with respect to an external environment. In some implementations, the control command identifies constraints associated with the one or more vehicle actions.

At operation 330, processing logic determines whether one or more conditions pertaining to the position of the AV (with respect to the external environment) are satisfied. Responsive to determining the one or more conditions are satisfied, processing logic proceeds to operation 340. Responsive to determining that one or more conditions are not satisfied, processing logic proceeds to operation 380.

At operation 340, processing logic provides a first instruction that permits the VCM to perform the energy saving action. In some implementations, the first instruction permits the VCM to deviate from the one or more vehicle actions identified in the control command and to perform an energy saving action with respect to the AV.

In some implementations, prior to providing the first instructions to the vehicle control module, processing logic determines whether deviating from the one or more vehicle actions identified in the control command and performing the energy saving action with respect to the AV is more energy efficient than continuing with a planned trajectory of the AV. If so, processing logic proceeds to operation 340. If not, processing logic proceeds to operation 380.

In some implementations, the energy saving action includes at least one of a disengagement of a powertrain of the AV, a withholding of a supply of energy to an engine of the AV, or a regenerative energy action.

In some implementations, the first instruction permits the VCM to deviate from constraints associated with the one or more vehicle actions and identifies a range within which the VCM can deviate from the constraints identified in the control command and/or a duration during which the VCM is permitted to deviate from the constraints.

At operation 350, processing logic receives an indication of a suggested future energy saving action. In some implementations, processing logic receives, from the VCM, an indication of a suggested future energy saving action to be performed by the VCM. Similar as described above, the VCM can select a future energy saving action to suggest based on sensing data (and in some cases contextual data as described herein) associated with the AV. Additional examples are described above such as with respect to operation 310 and with respect to the illustrative example of the future suggested cresting energy saving action.

At operation 360, processing logic determines one or more additional vehicle actions to move the AV to another position that allows the suggested future energy saving action to be performed. In some implementations, operation 360 is performed responsive to receiving the indication of the suggested future energy saving action.

At operation 370, processing logic provides an additional control command identifying the one or more additional vehicle actions to move the AV to the other position. In some implementations, subsequent to executing operation 370, processing logic can return to operation 330 and repeat operations beginning at operation 330 for the other position or future suggested energy saving action.

Responsive to determining that the one or more conditions pertaining to the position of the AV with respect to the external environment are not satisfied, processing logic provides, to the VCM, a second instruction that prohibits the VCM from deviating from the one or more vehicle actions and from performing the energy saving action with respect to the AV.

Figure 4:
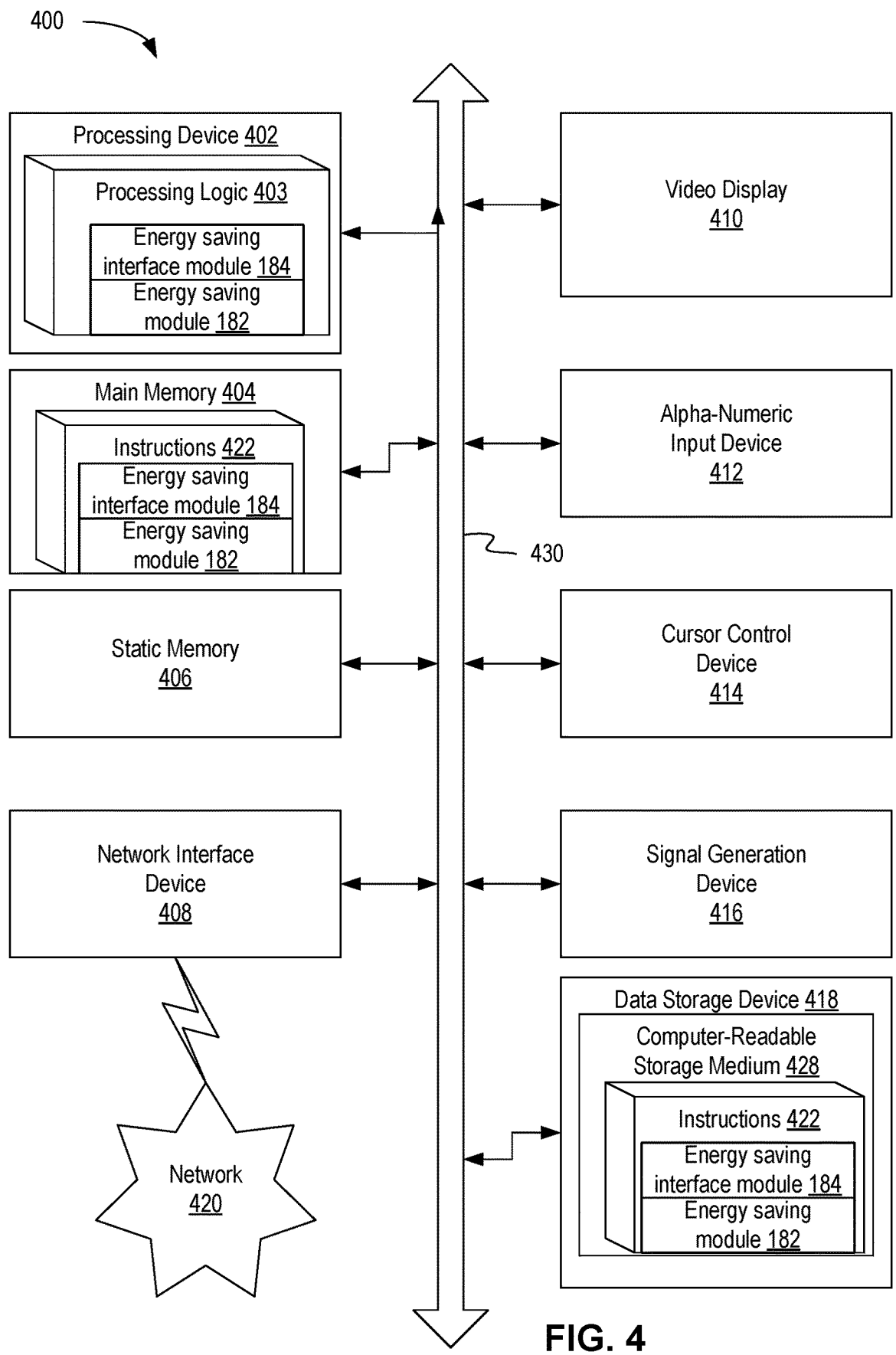
FIG. 4 depicts a block diagram of an example computer device within which a set of instructions, for causing the machine to perform any of the one or more methodologies discussed herein can be executed, in accordance with some implementations of the disclosure.

FIG. 4 depicts a block diagram of an example computer device 400 within which a set of instructions, for causing the machine to perform any of the one or more methodologies discussed herein can be executed, in accordance with some implementations of the disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor or CPU), which can include processing logic 403, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 402 can be configured to execute instructions performing any of the operations performed by energy saving interface module 184 or energy saving module 182.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the disclosure, executable instructions 422 can comprise executable instructions to perform any of the operations of energy saving interface module 184 or energy saving module 182.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
providing, by a processing device to a vehicle control module, a control command identifying one or more vehicle actions to be performed by the vehicle control module to control a position of an autonomous vehicle (AV) with respect to an external environment;
receiving, from the vehicle control module, an indication of a satisfaction of one or more criteria allowing an energy saving action to be performed by the vehicle control module;
responsive to receiving the indication of the satisfaction of the one or more criteria allowing the energy saving action to be performed and prior to initiating a performance of the energy saving action, evaluating whether to instruct the vehicle control module to perform the energy saving action, wherein the evaluating comprises determining whether one or more conditions pertaining to the position of the AV with respect to other vehicles in the external environment are satisfied; and
responsive to determining that the one or more conditions pertaining to the position of the AV with respect to the external environment are satisfied, providing, to the vehicle control module, a first instruction that permits the vehicle control module to deviate from the one or more vehicle actions identified in the control command and to perform the energy saving action with respect to the AV.

2. The method of claim 1, further comprising:
prior to providing the first instruction to the vehicle control module, determining that deviating from the one or more vehicle actions identified in the control command and performing the energy saving action with respect to the AV is more energy efficient than performing the one or more vehicle actions without deviation and continuing with a planned trajectory of the AV.

3. The method of claim 1, further comprising:
receiving, from the vehicle control module, an indication of a suggested future energy saving action to be performed by the vehicle control module;
responsive to the receiving the indication of the suggested future energy saving action, determining one or more additional vehicle actions to move the AV to another position that allows the suggested future energy saving action to be performed; and
providing an additional control command identifying the one or more additional vehicle actions to move the AV to the other position.

4. The method of claim 1, wherein the energy saving action comprises at least one of a disengagement of a powertrain of the AV, a withholding of a supply of energy to an engine of the AV, or a regenerative energy action.

5. The method of claim 1, wherein the control command identifies constraints associated with the one or more vehicle actions.

6. The method of claim 5, wherein the first instruction permits the vehicle control module to deviate from constraints associated with the one or more vehicle actions and identifies one or more of a range within which the vehicle control module can deviate from the constraints identified in the control command or a duration during which the vehicle control module is permitted to deviate from the constraints.

7. The method of claim 1, further comprising:
responsive to determining that the one or more conditions pertaining to the position of the AV with respect to the external environment are not satisfied, providing, to the vehicle control module, a second instruction that prohibits the vehicle control module from deviating from the one or more vehicle actions and from performing the energy saving action with respect to the AV.

8. The method of claim 1, wherein the vehicle control module comprises a third-party vehicle control module.

9. A system comprising:
a memory; and
a processing device, coupled to the memory, to perform operations comprising:
providing, to a vehicle control module, a control command identifying one or more vehicle actions to be performed by the vehicle control module to control a position of an autonomous vehicle (AV) with respect to an external environment;
receiving, from the vehicle control module, an indication of a satisfaction of one or more criteria allowing an energy saving action to be performed by the vehicle control module;
responsive to receiving the indication of the satisfaction of the one or more criteria allowing the energy saving action to be performed and prior to initiating a performance of the energy saving action, evaluating whether to instruct the vehicle control module to perform the energy saving action, wherein the evaluating comprises determining whether one or more conditions pertaining to the position of the AV with respect to other vehicles in the external environment are satisfied; and
responsive to determining that the one or more conditions pertaining to the position of the AV with respect to the external environment are satisfied, providing, to the vehicle control module, a first instruction that permits the vehicle control module to deviate from the one or more vehicle actions identified in the control command and to perform the energy saving action with respect to the AV.

10. The system of claim 9, the operations further comprising:
prior to providing the first instruction to the vehicle control module, determining that deviating from the one or more vehicle actions identified in the control command and performing the energy saving action with respect to the AV is more energy efficient than performing the one or more vehicle actions without deviation and continuing with a planned trajectory of the AV.

11. The system of claim 9, the operations further comprising:
receiving, from the vehicle control module, an indication of a suggested future energy saving action to be performed by the vehicle control module;
responsive to the receiving the indication of the suggested future energy saving action, determining one or more additional vehicle actions to move the AV to another position that allows the suggested future energy saving action to be performed; and
providing an additional control command identifying the one or more additional vehicle actions to move the AV to the other position.

12. The system of claim 9, wherein the energy saving action comprises at least one of a disengagement of a powertrain of the AV, a withholding of a supply of energy to an engine of the AV, or a regenerative energy action.

13. The system of claim 9, the operations further comprising:
responsive to determining that the one or more conditions pertaining to the position of the AV with respect to the external environment are not satisfied, providing, to the vehicle control module, a second instruction that prohibits the vehicle control module from deviating from the one or more vehicle actions and from performing the energy saving action with respect to the AV.

14. A non-transitory computer-readable medium having instructions stored thereon that, responsive to execution by a processing device, cause the processing device to perform operations comprising:
providing, by the processing device to a vehicle control module, a control command identifying one or more vehicle actions to be performed by the vehicle control module to control a position of an autonomous vehicle (AV) with respect to an external environment;
receiving, from the vehicle control module, an indication of a satisfaction of one or more criteria allowing an energy saving action to be performed by the vehicle control module;
responsive to receiving the indication of the satisfaction of the one or more criteria allowing the energy saving action to be performed and prior to initiating a performance of the energy saving action, evaluating whether to instruct the vehicle control module to perform the energy saving action, wherein the evaluating comprises determining whether one or more conditions pertaining to the position of the AV with respect to other vehicles in the external environment are satisfied; and
responsive to determining that the one or more conditions pertaining to the position of the AV with respect to the external environment are satisfied, providing, to the vehicle control module, a first instruction that permits the vehicle control module to deviate from the one or more vehicle actions identified in the control command and to perform the energy saving action with respect to the AV.

15. The non-transitory computer-readable medium of claim 14, the operations further comprising:
prior to providing the first instruction to the vehicle control module, determining that deviating from the one or more vehicle actions identified in the control command and performing the energy saving action with respect to the AV is more energy efficient than performing the one or more vehicle actions without deviation and continuing with a planned trajectory of the AV.

16. The non-transitory computer-readable medium of claim 14, the operations further comprising:
receiving, from the vehicle control module, an indication of a suggested future energy saving action to be performed by the vehicle control module;
responsive to the receiving the indication of the suggested future energy saving action, determining one or more additional vehicle actions to move the AV to another position that allows the suggested future energy saving action to be performed; and
providing an additional control command identifying the one or more additional vehicle actions to move the AV to the other position.

17. The non-transitory computer-readable medium of claim 14, the operations further comprising:

responsive to determining that the one or more conditions pertaining to the position of the AV with respect to the external environment are not satisfied, providing, to the vehicle control module, a second instruction that prohibits the vehicle control module from deviating from the one or more vehicle actions and from performing the energy saving action with respect to the AV.

* * * * *